United States Patent [19]
Shaw

[11] 3,749,816
[45] July 31, 1973

[54] CONDUCTOR BREAKOUT

[75] Inventor: Charles R. Shaw, North Olmsted, Ohio

[73] Assignee: Preformed Line Products Company, Cleveland, Ohio

[22] Filed: May 8, 1972

[21] Appl. No.: 251,456

[52] U.S. Cl............ 174/70 R, 174/70 S, 174/71 R, 174/92, 174/DIG. 12
[51] Int. Cl............................................. H02g 15/14
[58] Field of Search.............. 174/70 R, 70 S, 71 R, 174/72 R, 92, DIG. 12

[56] References Cited
UNITED STATES PATENTS

| | | | |
|---|---|---|---|
| 2,155,650 | 4/1939 | Gilbert............................ | 174/92 X |
| 2,471,465 | 5/1949 | Van Hasselt...................... | 174/70 S |
| 3,007,243 | 11/1961 | Peterson....................... | 174/DIG. 12 |
| 3,168,614 | 2/1965 | Munn et al....................... | 174/70 S |
| 3,270,312 | 8/1966 | Olsen............................. | 174/70 S X |

FOREIGN PATENTS OR APPLICATIONS

| | | | |
|---|---|---|---|
| 1,044,208 | 11/1958 | Germany......................... | 174/92 |
| 123,440 | 2/1919 | Great Britain.................. | 174/71 R |

Primary Examiner—Laramie E. Askin

[57] ABSTRACT

The disclosed appliance permits mid-span access to the electrical conductors of an electromechanical cable without loss of cable strength thereby enabling electronic instrumentation or the like to be selectively disposed along the cable length. A hollow shell includes a central conductor receiving cavity and opposed apertured end portions for receiving respective ends of the cable. Helically preformed rods are wrapped about the housing and extend in opposite directions along the sectional cable in tightly encircling and gripping relation therewith to effect a secure interconnection of the cable sections. Other features are disclosed.

8 Claims, 3 Drawing Figures

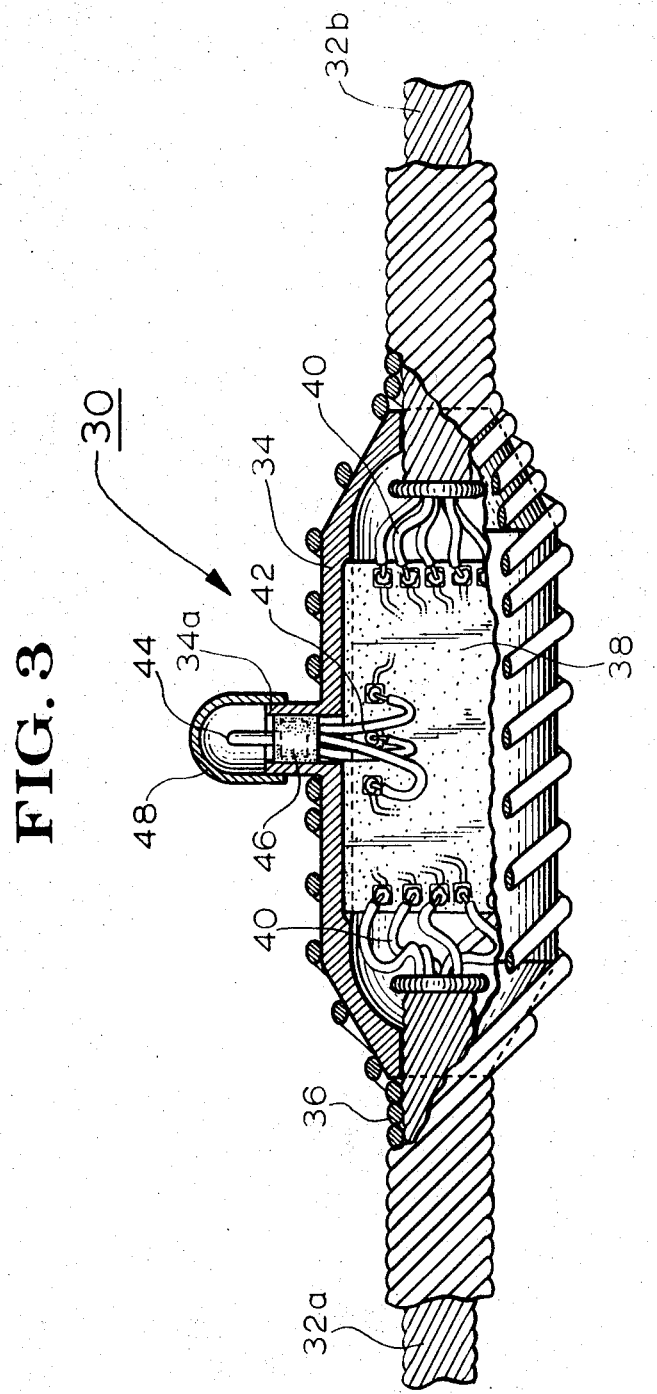

CONDUCTOR BREAKOUT

FIELD OF THE INVENTION

The present invention relates generally to appliances for linear bodies and, more particularly, to appliances of the aforesaid type for enabling mid-span access to the electrical signal conductors of an electromechanical cable without loss of cable strength. The invention is particularly useful in oceanographic instrumentation systems wherein electrical signal conductors running along the core of a load bearing cable must be connected at spaced intervals to electronic sensing and control instruments absent excessive stress and under hermetically sealed conditions. Accordingly, the invention will be described in the foregoing context although its more general utility will be recognized by those skilled in the art.

SUMMARY OF THE INVENTION

The present invention provides an appliance of a comparatively simple and economical, yet highly reliable construction for obtaining mid-span access to the electrical signal conductors of an electromechanical cable. No loss in cable strength is experienced by reason of installation of the appliance. Furthermore, the appliance is of a sufficiently streamlined configuration as not to materially alter the geometry of the cable. Thus, even with the appliance installed, the cable may still be stored on a reel or passed over a sheave. Additionally, the appliance of the invention permits a strain free coupling of electrical signal conductors carried by the cable within an enclosed and, if desired, a hermetically sealed housing.

In accordance with the present invention, there is provided an appliance for providing mid-span access to the electrical signal conductors carried within the core of an electromechanical cable while maintaining the strength of the cable. Specifically, the appliance comprises a hollow housing means defining a central receiving cavity for the signal conductors and a pair of oppositely disposed and coaxially aligned apertured end portions integral with the central portions for receiving respective end portions of an electromechanical cable. Helically preformed rod means of a predetermined internal diameter and pitch length are wrapped in tightly encircling relation about the housing and extend in opposite directions therefrom in tightly encircling and gripping relation to the cable end portions for effecting a secure mechanical interconnection of the cable end portions.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several FIGURES of which like reference numerals identify like elements and in which:

FIG. 3 is a side elevational view, partly in section, of an alternative embodiment of the appliance of FIG. 1 and which view also illustrates certain additional features of the present invention.

DESCRIPTION OF THE PREFERRED EMBODIMENTS

Figure 1:
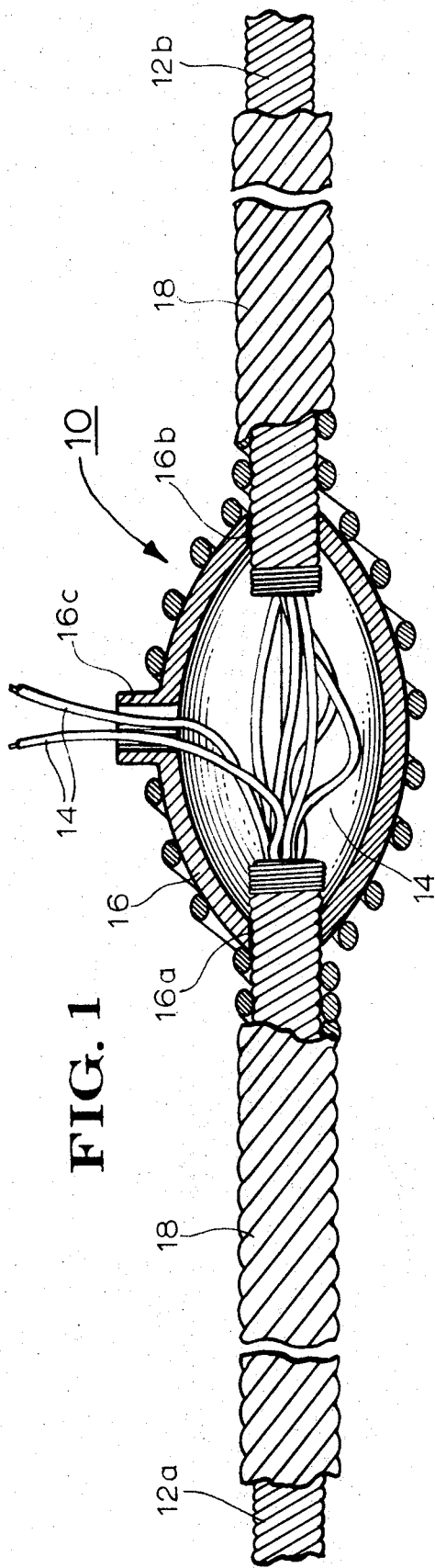
FIG. 1 is an elevational view, partly in section, of a preferred embodiment of the present invention.

Referring now to FIG. 1, the appliance 10 there illustrated is adapted to effect a secure mechanical interconnection of a pair of electromechanical cable end portions 12a and 12b in a manner so as to permit a stress free access to a plurality of electrical signal conductors 14 carried within the central core of the cable sections 12a and 12b. The structure of the present invention accomplishes this objective without loss in cable strength and without significantly altering cable geometry.

Specifically, the appliance 10 comprises a hollow housing means 16 composed of a plurality of mating sections cooperatively defining a central receiving cavity for the signal conductors 14. The housing 16 also includes a pair of oppositely disposed and coaxially aligned apertured end portions 16a and 16b for receiving respective ones of the cable end portions 12a and 12b. Preferably, the housing 16 is composed of a pair of similar and mating half sections that cooperatively define a rigid shell of the illustrated ellipsoidal or egg-shaped contour. If desired or necessary, conventional means may be utilized to effect a hermetic seal between the mating half-sections of the housing as well as between the sidewalls of the apertured end portions 16a and 16b and the respective cable end sections 12a and 12b.

The housing 16 may vary in size according to the space requirements of the central electrical conductor receiving cavity of the housing. Preferably, the housing 16 is made as small and as streamlined as possible in order to minimize the disruption of cable geometry. Electrical signal leads may enter or exit the housing 16 through one or more apertures 16c disposed about the periphery of the housing. Preferably an upright shoulder or flange portion is formed about the aperture 16c to protect the electrical leads 14 passing therethrough. An apertured plug of conventional design and composed of, for example, a resilient elastomeric material may be installed within the aperture 16c to hermetically seal the passageway.

The housing 16 is retained in secure and assembled relation with the cable end portions 12a and 12b by means of helically preformed rod means 18. The rods 18 are of conventional form having a suitable predetermined pitch length and a nominal internal diameter slightly smaller than that of the cable end portions 12a and 12b. The rods 18 are wrapped in tightly encircling relation about the housing 16 and extend in opposite directions therefrom in tightly encircling and gripping relation to the cable end portions 12a and 12b for effecting a secure mechanical interconnection of the cable end portions.

The assembly of the appliance is promptly and simply accomplished and in this regard the methods for forming protuberances on cables disclosed and claimed in U.S. Pat. No. 3,007,243-Peterson, and assigned to the same assignee as the present invention, may effectively be utilized in assemblying the appliance 10. Briefly, the assembly of the appliance 10 may be initiated by suitably locating the cable end portions 12a and 12b in one of the mating half-sections of the housing 16. The electrical signal conductors 14 are then spliced to one another or coupled to electrical circuitry (not shown) contained within the housing. The top section of the housing 16 is then installed over the lower section with any entry or exit conductor leads 14 being drawn through the housing aperture 16c. The half-sections of the housing 16 may temporarily be secured to one another by tape or the like or other means may be used to effect a firm and more permanent interconnection of the housing sections. Also, as previously mentioned, the housing sections may be hermetically sealed to one another and hermetic seals may be made at each of the apertures 16a–c.

Once the housing 16 has been suitably installed on the cable, the helical rods 18 are installed and preferably arranged so as to extend an equal length in either direction from the housing in gripping relation with the cable end portions 12a and 12b. By a suitable selection of rods, no sacrifice in cable strength will be made by reason of installation of the appliance 10. It will be understood that the appliance 10 may be used to join severed sections of the same cable, different cables and even cables of differing diameter. Also multiple appliances may be installed at spaced intervals along a span of cable.

Figure 2:
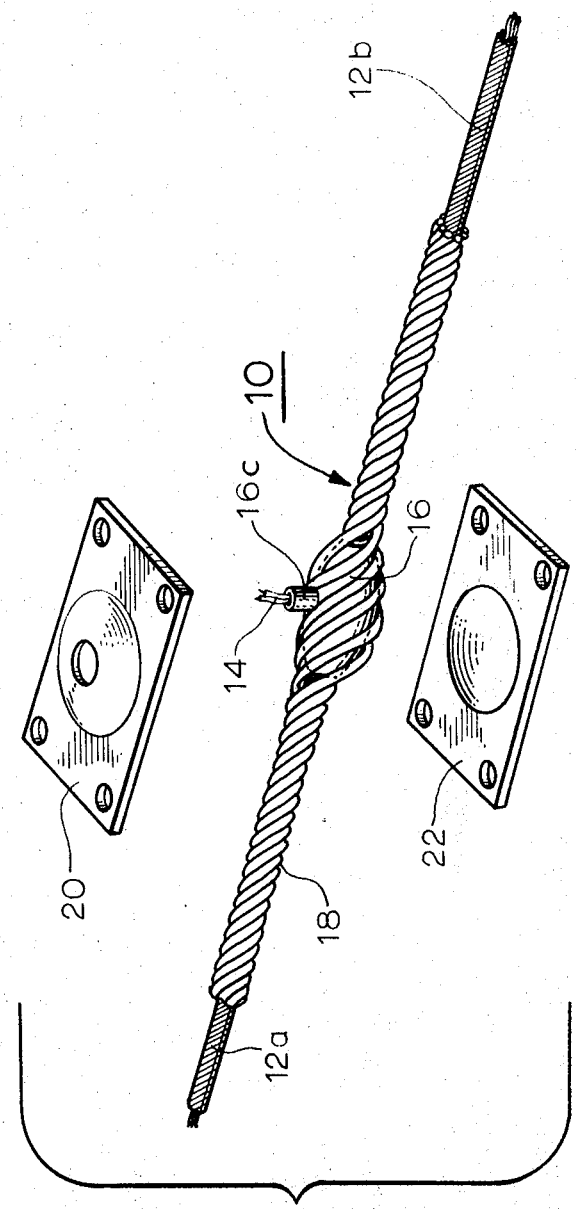
FIG. 2 is a perspective view illustrating the appliance of FIG. 1 as well as a further and optional feature of the invention.

A perspective view of the appliance 10 in its fully assembled form may be seen by reference to FIG. 2. There is also illustrated in FIG. 2 a support plate means comprising a pair of mating plates 20 and 22 of similar construction to one another. The plates 20 and 22 are adapted to provide a rigid and secure mounting base for electronic instrumentation or the like. To this end, the support plates 20 and 22 each include a central portion of a configuration conforming to that of the rod enclosed housing 16 and a surrounding peripheral flange portion facilitating bolting of the plate members 20 and 22 to one another and to an electronic instrument package or the like (not shown). Bolt receiving apertures are disposed in each of the four corners of the plates 20 and 22. The plate 20 is provided with an aperture in its central portion in order to pass the flange of the housing aperture 16c. The upstanding flange of housing 16 in conjunction with the complementary aperture of the plate 20 preclude the assembled plate members 20 and 22 from rotating relative to the housing 16.

The installation of the support plate means 20, 22 as well as the associated instrument package (not shown) disrupt the geometry of the cable and it may not be possible to wind the cable on a spool or pass it over a sheave without first removing these additional members.

A modified embodiment of the invention is illustrated in FIG. 3. Specifically, the appliance 30 there illustrated effects a secure mechanical interconnection of a pair of cable end portions 32a and 32b by means of a housing structure 34 and a set of helically preformed rods 36. The components 34 and 36 as well as their assembly is generally similar to that of the appliance 10. However, in order to provide an enlarged housing cavity, the housing 34 is formed of a comparatively long cylindrical central portion with oppositely disposed generally conical end portions. Like the housing 16, the housing 34 is preferably composed of a pair of rigid and mating half-sections.

In the present instance, the central portion of the housing cavity is provided with electronic circuit means 38 in the form of a printed circuit board encapsulated in polyurethane. The electrical signal conductors 40 emanating from each of the cable end portions 32a and 32b are soldered or otherwise suitably connected to terminals at opposite ends of the printed circuit board 38. The circuit board 38 is also connected by electrical signal leads 42 to a thermistor 44. The thermistor 44 is disposed externally of the housing 34 so as to sense the temperature of the surrounding water or the like. To this end, the housing 34 is provided with a flanged opening 34a in which there is centrally disposed a resilient plug member 46 for supporting the thermistor 44. A dome cover 48 is slidably fitted over the flanged opening 34a to provide a protective covering for the thermistor element 44.

While particular embodiments of the present invention have been shown and described, it is apparent that various changes and modifications may be made, and it is therefore intended in the following claims to cover all such modifications and changes as may fall within the true spirit and scope of this invention.

I claim:

1. An appliance for providing mid-span access to the electrical signal conductors carried within the core of electromechanical cable means while maintaining the strength of said cable means, comprising:

hollow housing means defining a central receiving cavity for said signal conductors and a pair of oppositely disposed and coaxially aligned apertured end portions integrally formed with the central cavity defining portion of said housing means, respective end portions of said electromechanical cable means being disposed within associated ones of said apertured end portions of said housing means and said signal conductors being disposed within said central cavity defining portion of said housing means;

and helically preformed rod means composed of a resilient material and of a predetermined internal diameter and pitch length wrapped in tightly encircling and resilient gripping relation about said housing means and extending in opposite directions therefrom in tightly encircling and resilient gripping relation to said end portions of said cable means for effecting a secure mechanical interconnection of said end portions of said cable means while providing for a stress-free interconnection of said signal conductors within said central receiving cavity.

2. The appliance of claim 1 in which said housing means is an ellipsoidal shell composed of a pair of mating half-sections.

3. The appliance of claim 1 in which said housing means is provided with at least one aperture for passing electrical signal conductors.

4. The appliance of claim 3 and further including support plate means composed of a pair of mating sections, each having a central portion of a contour conforming to a portion of said housing means and a peripheral portion including bolt receiving apertures, said mating sections being disposed in conforming and bolted relation about the assembly of said housing means and said rod means.

5. The appliance of claim 3 and further including electronic instrumentation mounted on said housing means.

6. The appliance of claim 1 in which said central portion of said housing means is of a cylindrical contour and said oppositely disposed end portions are of a conical contour.

7. The appliance of claim 1 and further including electronic circuit means disposed in said housing means.

8. The appliance of claim 1 in which said housing means is comprised of a plurality of mating sections.

* * * * *